(12) United States Patent
Handrich

(10) Patent No.: US 6,691,572 B1
(45) Date of Patent: Feb. 17, 2004

(54) ACCELERATION MEASURING DEVICE WITH PULSE WIDTH MODULATION RESETTING

(75) Inventor: Eberhard Handrich, Kirchzarten (DE)

(73) Assignee: Litef GmbH, Freiburg im Breisgau (DE)

( * ) Notice: Subject to any disclaimer, the term of this patent is extended or adjusted under 35 U.S.C. 154(b) by 0 days.

(21) Appl. No.: 10/019,884

(22) PCT Filed: Jun. 6, 2000

(86) PCT No.: PCT/EP00/05186
§ 371 (c)(1), (2), (4) Date: Dec. 27, 2001

(87) PCT Pub. No.: WO01/02868
PCT Pub. Date: Jan. 11, 2001

(30) Foreign Application Priority Data

Jun. 29, 1999 (DE) .......................... 199 29 767

(51) Int. Cl.$^7$ ............................ G01P 15/13; G01L 1/00
(52) U.S. Cl. .................... 73/514.18; 73/862.61
(58) Field of Search ................... 73/514.18, 514.17, 73/514.32, 514.36, 514.21, 862.61, 862.626

(56) References Cited

U.S. PATENT DOCUMENTS

| | | | | |
|---|---|---|---|---|
| 3,911,738 A | * | 10/1975 | Fischer | 73/514.18 |
| 4,987,779 A | * | 1/1991 | McBrien | 73/514.18 |
| 5,095,750 A | * | 3/1992 | Suzuki et al. | 73/514.18 |
| 5,142,921 A | | 9/1992 | Stewart et al. | |
| 5,440,939 A | | 8/1995 | Barny et al. | |
| 5,454,266 A | * | 10/1995 | Chevroulet et al. | 73/514.18 |
| 5,473,946 A | | 12/1995 | Wyse et al. | |
| 5,600,066 A | | 2/1997 | Torregrosa | |

FOREIGN PATENT DOCUMENTS

| | | |
|---|---|---|
| DE | 4135624 | 4/1992 |
| EP | 0338688 | 10/1989 |
| EP | 69311831 | 10/1993 |
| FR | 2714973 | 7/1995 |

* cited by examiner

Primary Examiner—Helen Kwok
(74) Attorney, Agent, or Firm—Elliott N. Kramsky

(57) ABSTRACT

An accelerometer having a micromechanical pendulum, a capacitive pick off and a control loop reset by electrostatic forces and, in a time sequence, applies a resetting voltage between the pendulum and two electrodes spaced apart on opposite sides of the pendulum. The control loop is designed such that, firstly, no charge difference flows via the pendulum and a force of identical magnitude thus acts on both sides of the pendulum. Secondly, when a pendulum deflection occurs in response to a voltage difference, the time durations of the respectively applied voltage pulses are impeded in accordance with the acceleration. The simultaneous control of two components results in the control bias tending essentially to zero. The capability of temporarily switching to detection of the total charge as the control variable also allows control of the scale factor of the accelerometer.

2 Claims, 5 Drawing Sheets

ACCELERATION MEASURING DEVICE WITH PULSE WIDTH MODULATION RESETTING

BACKGROUND

1. Field of the Invention

The present invention relates to accelerometers of the type that include a micromechanical pendulum. More particularly, the invention pertains to such an accelerometer with control loop resetting.

2. Description of the Prior Art

Accelerometers that include a micromechanical pendulum in a differential capacitor arrangement with a resetting control loop are incorporated into, and proposed for, various basic devices. The operation of such an arrangement will be described with reference to the embodiments illustrated in FIGS. 2 and 3.

The first solution, shown in FIG. 2, employs a digital computer coupled to an analog charge amplifier. A computer 2 directs voltage pulses $U_1$, $U_2$ (see FIG. 4) alternately to an upper electrode $E_1$ and to a lower electrode $E_2$ arranged relative to a pendulum P. If the arrangement is mistuned, a charge difference flows via the pendulum P, which is amplified at $U_3$ and is digitized at the A/D converter 4. The computer 2 linearizes the pendulum characteristics and compensates (as can be seen from the central and right-hand diagrams of FIG. 4) for accelerations acting on the pendulum P by the pulse-width ratios of the time-sequential voltage pulses $U_1$ and $U_2$, on the upper and lower electrodes $E_1$, $E_2$, respectively. At the same time, the computer 2 adjusts the offset of the pendulum P, and compensates for bias and scale factor, particularly as a function of temperature.

The second solution, illustrated in FIG. 3 and the three timing diagrams of FIG. 5, uses analog charge control with a digital section 1 for pulse-width resetting when the pendulum P is deflected. The individual charges on the two capacitors $C_1$, $C_2$ are defined by a precision current source 5 over a constant, short time interval (e.g. 25 $\mu$s). In this case, only the current flowing via the pendulum P is controlled. Although the current is applied via the electrodes $E_1$, $E_2$, it is not governed by the control system 6, 7. The charge control means that the effective resetting force per electrode is independent of pendulum position and need not be linearized. The voltages on the electrodes $E_1$, $E_2$ will differ, however, when the pendulum P is deflected. The charge difference represents the pick off voltage located at the input of an operational amplifier 6. Acceleration is indicated by the charge difference, and is compensated by the pulse-width ratio. This is accomplished with a digital test within a separate time slot of, for example, 75 $\mu$s.

The two known solutions explained briefly with reference to FIGS. 2 and 4, as well as 3 and 5, for the resetting control can be analyzed as follows. The first solution (FIGS. 2 and 4) is largely digital with bias and scale factor internally compensated. The voltage control on the electrodes $E_1$, $E_2$ and linearization are matched to the stability of the pick off offset. In this situation, the requirements for relative pick off accuracy result from the potential and required bias accuracies. A range (e.g. 500 $\mu$g to 10 g) results in a required bias accuracy of $5\times10^{-5}$.

Corresponding considerations with regard to the second known solution (FIGS. 3 and 5) lead to a relative pick off or bias accuracy of $1.7\times10^{-3}$ with respect to required acceleration for full-scale deflection of the pendulum of, for example, 500 $\mu$g to 0.3 g. Tests verify that the control electronics for the second approach are considerably less sensitive to bias errors. However, this solution has the disadvantage that circuit complexity is considerably greater and the overall measurement range is reduced by about 25% for corresponding voltages. Furthermore, it is impossible to compensate internally for scale factor.

The theory of switched electrostatic resetting for micromechanical pendulum systems yields the following expression for mean resetting force F:

$$F = Q_1 E_1 ((\Delta t + dt)/\Delta t) - Q_2 E_2 ((\Delta t - dt)/\Delta t) \quad (1)$$

For small angles, assuming linear deflection, the normal approximation $\sin\alpha \approx \alpha$ can be assumed and the switching times for both voltages are the same. In such case:

| | |
|---|---|
| F | mean force acting |
| $Q_{1,2}$ | Charge on the upper and lower capacitances $C_1$ and $C_2$, respectively |
| $E_{1,2}$ | Field strength between the pendulum P and the upper and lower electrodes $E_1$ and $E_2$, respectively |
| $\Delta t$ | Time duration of switching pulses |
| dt | Difference between the two switching pulses on the upper and lower capacitances $C_1$ and $C_2$, respectively |

Due to resetting forces, any asymmetry can produce an additional bias error, (referred to as the reset bias or bias B). Setting dt=0 and F=m·a (m=mass of the pendulum P, a=acceleration), bias B is obtained from (1) as:

$$B = (Q_1 E_1 - Q_2 E_2)(1/M) \quad (2)$$

Scale factor S for the acceleration is obtained from the component where dt≠0:

$$S = (Q_1 E_1 + Q_2 E_2) \frac{dt}{\Delta t} \frac{1}{m} \quad (3)$$

The range of reset acceleration for positive and negative acceleration $R_+$ or $R_-$ is given by:

$$R_+ = \left[ Q_1 E_1 \left( \frac{\Delta t + dt_{max}}{\Delta t} \right) - Q_2 E_2 \left( \frac{\Delta t - dt_{max}}{\Delta t} \right) \right] \frac{1}{m} \quad (4)$$

$$R_- = \left[ Q_1 E_1 \left( \frac{\Delta t - dt_{max}}{\Delta t} \right) - Q_2 E_2 \left( \frac{\Delta t + dt_{max}}{\Delta t} \right) \right] \frac{1}{m}$$

For simplicity, assuming that $dt_{max} = \Delta t$:

$$R_+ = \frac{2 Q_1 E_1}{m} \text{ and } R_- = \frac{2 Q_2 E_2}{m} \quad (5)$$

In the method described above as the first recommended solution (FIGS. 2 and 4), the voltages $U_1$ and $U_2$ are applied to the capacitors $C_1$, $C_2$:

$$Q_1 = C_1 U_1 = \varepsilon_0 \frac{A}{d_1} U_1 \quad (6)$$

$$Q_2 = C_2 U_2 = \varepsilon_0 \frac{A}{d_2} U_2$$

-continued $$E_1 = \frac{U_1}{d_1}$$

$$E_2 = \frac{U_2}{d_2}$$

In this case:
A Areas of the capacitors $C_1$, $C_2$; assumed equal
$\varepsilon_0$ Dielectric constant
$d_{1,2}$ Distances between the pendulum P and the respective electrodes $E_1$ and $E_2$.
If the following substitutions are made $$d_1 = d_0 + d,\ d_2 = d_0 - d,\ U_1 = U_0 + U \text{ and } U_2 = U_0 - U, \text{ where}$$

$U_0$=mean switching voltage, then the following formulas are obtained from equations (2), (3), (5) and equation (6) if $d \ll d_0$ and $U \ll U_0$:

$$B \approx \frac{4\varepsilon A U_0^2}{m d_0^2}\left(\frac{U}{U_0} - \frac{d}{d_0}\right) \tag{7a}$$

$$S \approx \frac{2\varepsilon A U_0^2}{m d_0^2}\frac{dt}{\Delta t} \tag{7b}$$

$$R \approx \frac{2\varepsilon_0 A U_0^2}{m d_0^2} \tag{7c}$$

In this approximation is $R_- = R_+ = R$, as is immediately evident for $dt = \Delta t$ from equation 7b.

The major variables influencing resetting bias B, scale factor S and reset acceleration R are voltages $U_0$ and U, and distances $D_0$ and D. As can be seen from equation 7b, the scale factor S depends on $(U_0/d_0)^2$. The first-described solution is based on the method and thus has the disadvantages, that the scale factor S depends critically on the stability of the mean switching voltage $U_0$ and all the possible contact resistances to the electrodes, while the scale factor S similarly varies critically with changes to the mean distances $D_0$ between the capacitors $C_1$, $C_2$ (due, for example, to temperature or pressure changes).

Since the resetting bias B is measured via the scale factor S as a time change dt, the dependency on $(U_0/d_0)^2$ stands out—as can be seen from equation 7a. The resetting bias B also depends linearly on $U/U_0$ and $d/d_0$. The stability requirements for this increase with the reset acceleration range since it follows from equations 7a and 7c that:

$$B \approx 2R(U/U_0 - d/d_0) \tag{8}$$

The first-described solution is thus subject to the disadvantage that, for example, for a resettable acceleration range of 80 g and a resetting bias stability of 500 μg, the variables that govern the relationships of the scale factor S and of the resetting bias B must be kept stable to $6\times10^{-6}$. This is particularly difficult for the variable $d/d_0$ as, for micromechanical pendulums with realistic thickness and restricted resetting voltage, the distance $D_0 < 3\times10^{-6}$ m must be complied with, resulting in accuracy requirements of $d \ll 1.8\times 10^{-11}$ m for the deflection d.

The second solution (FIGS. 3 and 5) is based on a constant charge Q being applied to each of the two capacitors $C_1$, $C_2$ between the pendulum P and the electrodes $E_1$, $E_2$ by a constant current source 5 over a fixed predetermined time window $\Delta t_i$. This measure is intended to result in:

$$Q_1 = Q_2 = Q \tag{9a}$$

Furthermore, for the capacitors $C_1$, $C_2$:

$$Q = \varepsilon_0 \frac{A}{d_1}U_1 = \varepsilon_0 \frac{A}{d_2}U_2 \tag{9a}$$

It follows that:

$$E_1 = \frac{U_1}{d_1} = \frac{U_2}{d_2} = E_2 = E \tag{10}$$

Thus, for the resetting bias B, using equation 2:

$$B = (Q \cdot E - Q \cdot E)\frac{1}{m} \equiv 0 \tag{11a}$$

For scale factor S, using equation 3:

$$S = 2Q \cdot E \frac{dt}{\Delta t}\frac{1}{m} \tag{11b}$$

The second solution is thus advantageous in that the resetting bias B disappears and the scale factor S is not dependent on the deflection d. Thus, no linearization is required. The accuracy of scale factor S corresponds to the Q-factor of the current control and the time control for current charging. If, in addition, one substitutes:

$$U_1 = U_0 + \Delta U$$

$$U_2 = U_0 - \Delta U$$

then equation 10 applies for all $\Delta U$, and thus also for $\Delta U = 0$, from which it follows that:

$$E = \frac{U_1}{d_1} = \frac{U_1}{d_2} = \frac{U_0}{d_0} \tag{12}$$

This means that, for example:

$$\frac{d_1 - d_0}{d_0} = \frac{U_1 - U_0}{U_0} = \frac{\Delta U}{U_0} \tag{13}$$

The voltage difference $\Delta U$ thus represents a measure of the deflection of the pendulum P in response to external acceleration. This voltage difference $\Delta U$ in the illustrated control loop influences the time difference dt of the switching pulses in such a way that the pendulum P is held at $d_0$ with respect to the electrodes $E_1$, $E_2$, and acceleration is compensated. This type of charge control results in a resetting force that is independent of deflection and constant. Thus, there is no need for the otherwise-necessary linearization of the resetting force.

The latter-described method (FIGS. 2 and 4) has two considerable disadvantages,

Approximately 25% of the resetting cycle is required for application of the charges $Q = i \cdot \Delta t_i$, so that the maximum control time $dt_{max}$ is reduced, and the range of the reset acceleration is thus restricted in accordance with equation 4.

The current i may flow only into the actual effective capacitances $C_1$, $C_2$ between the pendulum P and the electrodes $E_1$, $E_2$. However, micromechanical accelerometers generally have considerably greater stray capacitances than effective capacitances so that, in practice, this requirement results in considerable difficulties.

SUMMARY OF THE INVENTION

The preceding and other shortcomings of the prior art are addressed by the present invention that provides an improvement in an accelerometer of the type having a micromechanical pendulum, capacitive pick off and a control loop reset by electrostatic forces. The control loop, in a sequential time sequence, applies a resetting voltage between the pendulum and a first or second electrode that are fixed relative to the pendulum and aligned at respectively-defined distances from opposite surfaces of the pendulum.

The improvement to such apparatus provided by the invention includes the voltage levels of pulses that act sequentially on the two electrodes being such that no charge difference flows when the same force acts on both sides of the pendulum. Additionally, the time durations of the respectively-applied voltage pulses in response to an acceleration are responsive to the voltage differences between the two electrodes so that the difference between the time durations corresponds to the acceleration.

As a consequence, the control loop detects a charge difference flowing via the pendulum as a control variable and influences the electrostatic resetting forces on the pendulum.

The foregoing and other features of the invention will become further apparent from the detailed description that follows. Such description is accompanied by a set of drawing figures. Numerals of the drawing figures, corresponding to those of the written description, point to the features of the invention with like numerals referring to like features throughout both the written description and the drawing figures.

DETAILED DESCRIPTION OF THE PREFERRED EMBODIMENT

Figure 1:
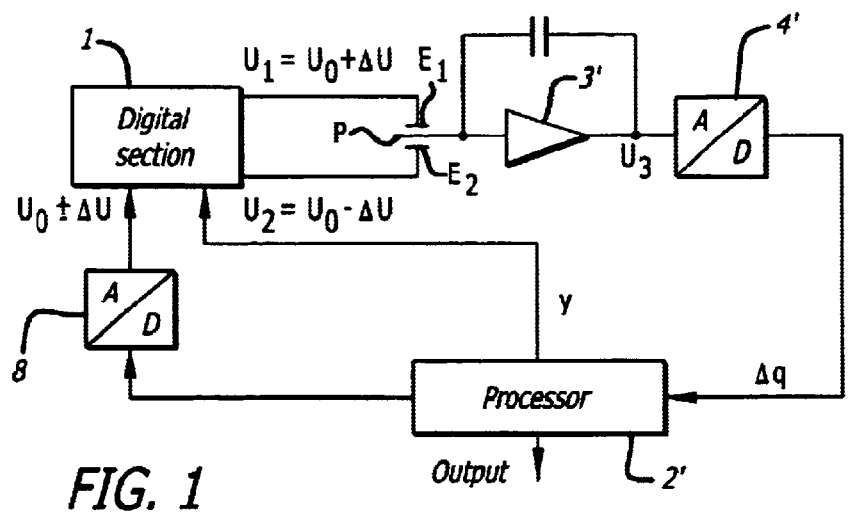
FIG. 1 is a schematic diagram of a circuit for an accelerometer having a micromechanical pendulum in accordance with the invention.

FIG. 1 is a schematic diagram of a circuit for an accelerometer having a micromechanical pendulum in accordance with the invention. The invention overcomes the described disadvantages of the prior art by controlling the charge difference in the capacitors $C_1$, $C_2$ (i.e. $Q_1-Q_2$). A charge amplifier 3', connected at its input side to the pendulum P, indicates the charge difference $(Q_1-Q_2)$ and applies the corresponding voltage value $U_3$ after analog/digital conversion at 4', to the input of the digital regulator (processor) 2' to vary the switching voltages, after analog/digital conversion at 8, of the capacitors $C_1$, $C_2$ such that $Q_1$ is equal to $Q_2$. In the same way as the second known solution (explained above), the resetting bias B tends to zero (see equation 11a). This is true irrespective of the stray capacitances of micromechanical accelerometers as this does not influence the charge difference. In contrast to the second-mentioned solution described above, the resetting range is not restricted. There is no need for linearization of the resetting force, so a major advantage of the second known solution variant is maintained, while its disadvantage of restricted resetting range is avoided.

The implementation of this idea is shown in FIG. 1. The micromechanical acceleration sensor is once again shown in the form of a double capacitor that alternatively has $U_1=U_0+\Delta U$ and $U_2=U_0-\Delta U$ applied to it, as is shown in the leftmost portion of FIG. 6. The charge difference $\Delta U \approx U_3$ is indicated by the charge amplifier 3' and then A/D-converted at 4'. The processor 2' then closes both control loops. First, it controls $\Delta U$ from $U_{1,2}=U_0\pm\Delta U$ such that $U_3$ becomes a minimum. Secondly, it employs the duty ratio y to control the switching times so that $\Delta U$ becomes a minimum. Of the three timing diagrams of FIG. 6, the first shows that no signal $U_3$ is present when there is no deflection. The central diagram shows the situation where only the first component or the first control loop is effective, with the second component being ineffective, or the second control loop being open. As can be seen, the deflection results in the alternating signal $U_3$ whose amplitude is controlled to a minimum when the duty ratio or duty cycle is the same. The third diagram shows the signals when both components or both control loops are in operation at the same time. The voltage $\Delta U$ controls the time clock or the duty ratio such that $\Delta U$ becomes a minimum. The duty ratio y is proportional to the acceleration to be measured, and is output.

Figure 3:
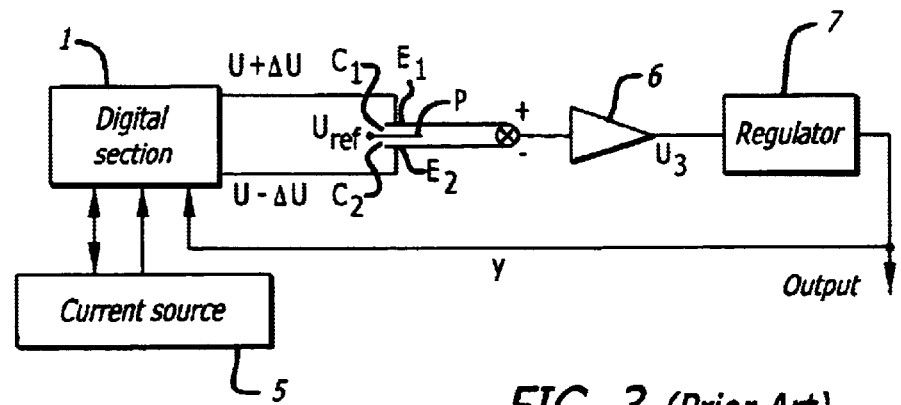
FIG. 3 is a schematic diagram of a second known embodiment of a control arrangement for a micromechanical accelerometer with charge control.
Figure 6:
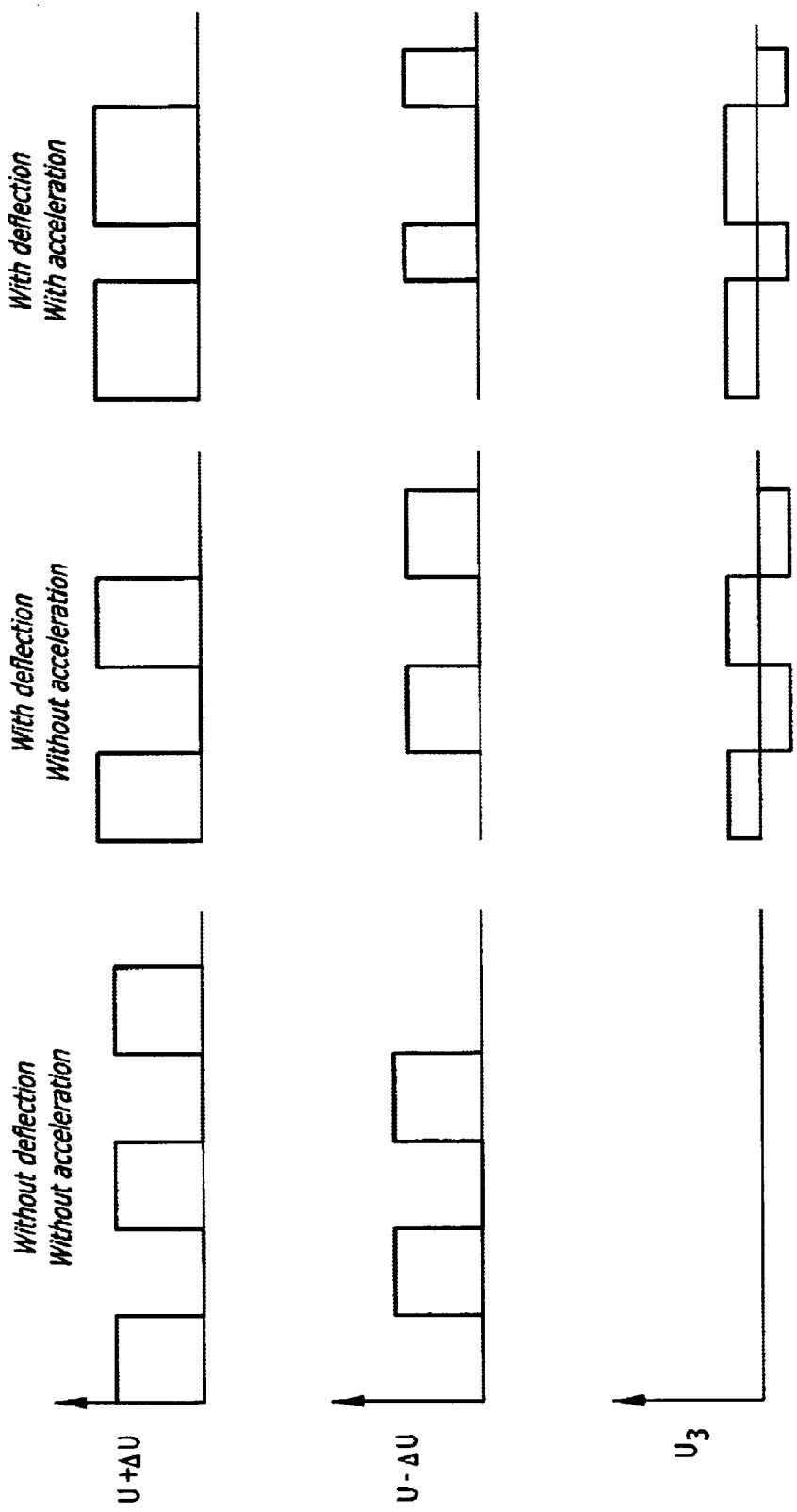
FIG. 6 is a series of timing diagrams corresponding to FIGS. 4 and 5 for various operating states of a circuit in accordance with the invention as illustrated in FIG. 1.

In order to illustrate the principle, the three diagrams of FIG. 6 show both $\Delta U$ and $U_3$ in emphasized form. In an ideal situation, these signals occur only temporarily, and are controlled as far as possible such that $\Delta U=0$ and $U_3=0$. Since, in the solution according to the invention, the first component of the control loop (the first control loop) controls only the charge difference $(Q_1-Q_2)$, in contrast to control of the individual charges $Q_1$ and $Q_2$ in the known solution shown in FIG. 3, initially, based on equation 11b, the scale factor S is not controlled as the factor 2Q essentially represents the sum $(Q_1+Q_2)$.

This problem can now be overcome using the second part of the control loop, or the second component of the control loop, by varying the switching pattern for the charging voltages such that the charge amplifier 3' has the charge difference applied to it by push-pull switching of $U_1$ and $U_2$ most of the time, but occasionally has the sum charge applied to it by switching $U_1$ and $U_2$ in synchronism. Measurement of the sum charge also allows the scale factor to be compensated for or controlled computationally, in that $U_0$ is controlled from $U_{1,2}=U_0+\Delta U$ so that the sum charge, measured when the two are in synchronism, has a constant value. In this case, the timing of the voltage switching is reinforced such that both the charge difference $(Q_1-Q_2)$ during push-pull switching of the voltages $U+\Delta U$ and $U-\Delta U$, and the charge sum $Q_1+Q_2$ with synchronous switching of the voltages, are detected by the voltage $U_3$.

Figure 7:
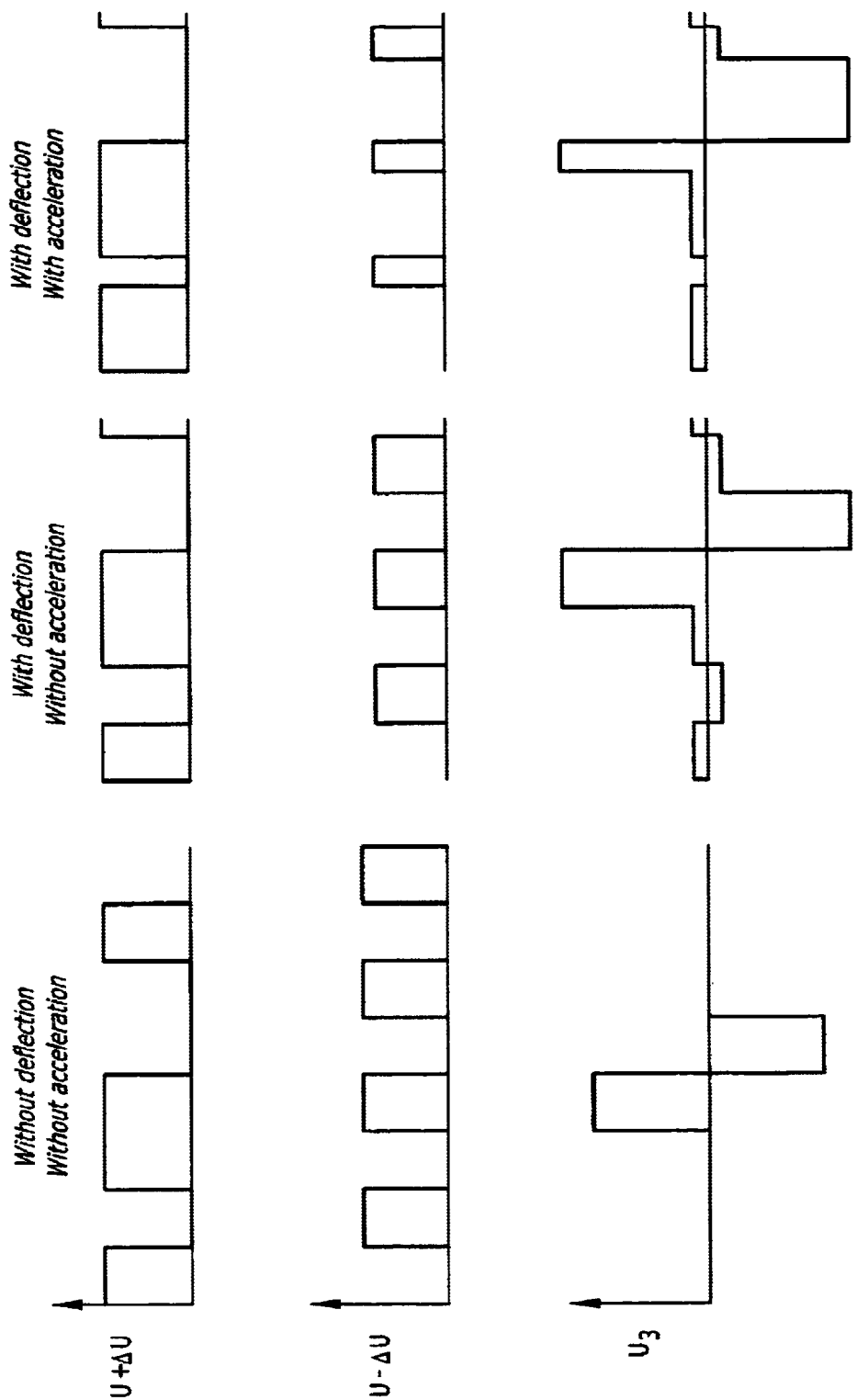
FIG. 7 is a series of timing diagrams for three additional operating states of the circuit in accordance with the invention of FIG. 1.

FIG. 7 shows a switching pattern, similar to that of FIG. 6, of three diagrams in which detection of the charge sums is also provided, via which the scale factor can be controlled. First, it can be seen that the first component of the control loop (for short, the first control loop) will set the voltage $\Delta U$ such that $(Q_1-Q_2)=0$. In the second component of the control loop (for short, the second control loop) $\Delta U$ controls the duty ratio y such that $\Delta U=0$. In this case, y represents the measurement variable "acceleration", intended to be measured at a high clock rate. The charge difference $(Q_1-Q_2)$ is sampled frequently, with the scale factor S initially remaining uncontrolled. The scale factor generally varies only slowly, however, due, for example, to temperature changes. The sum charge $(Q_1+Q_2)$ is therefore only rarely required. The scale factor is taken into account purely computationally between the signal y and the output, or is stabilized at a constant value via the second control loop.

Figure 2:
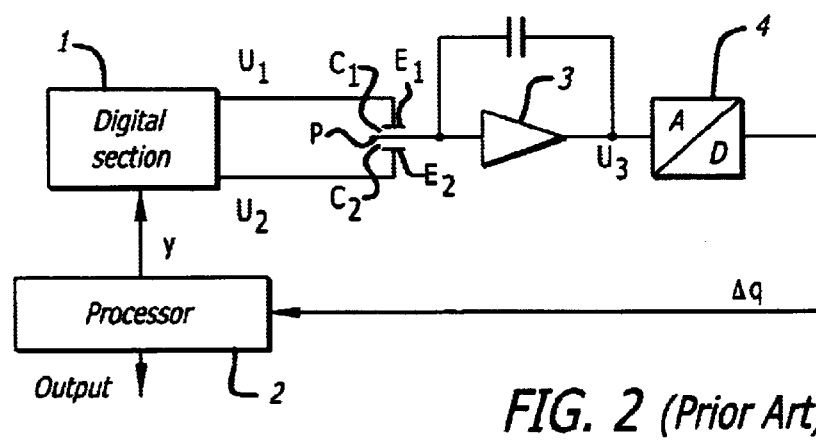
FIG. 2 is a schematic diagram of a first known embodiment of a largely digital control loop for a micromechanical accelerometer with resetting via pulse-width variation of two voltage pulses.
Figure 4:
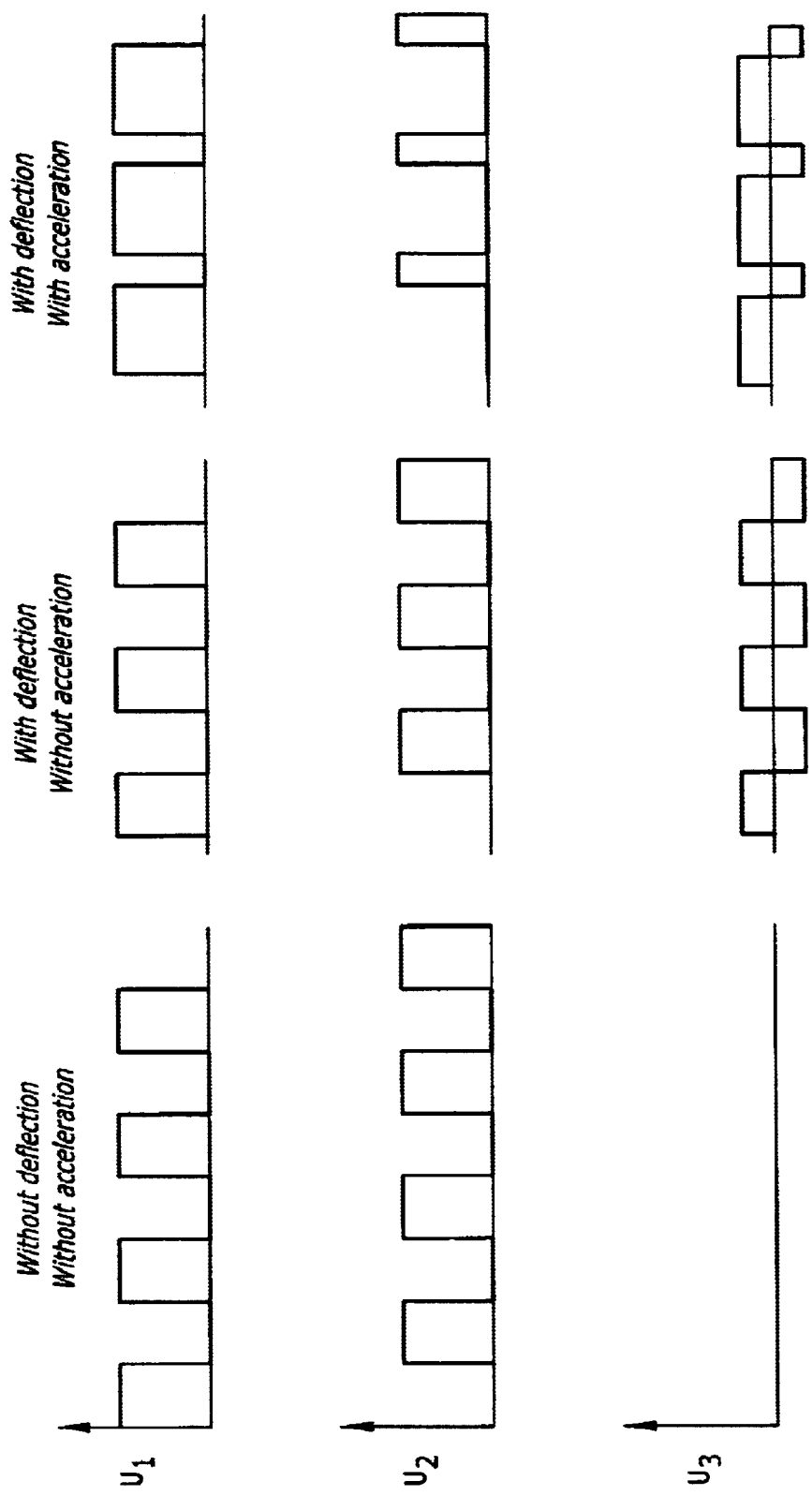
FIG. 4 is a series of timing diagrams for illustrating the first known embodiment which indicated how the resetting control circuit reacts to deflection of the pendulum P with acceleration by varying the pulse-width ratio of the voltages $U_1$, $U_2$.
Figure 5:
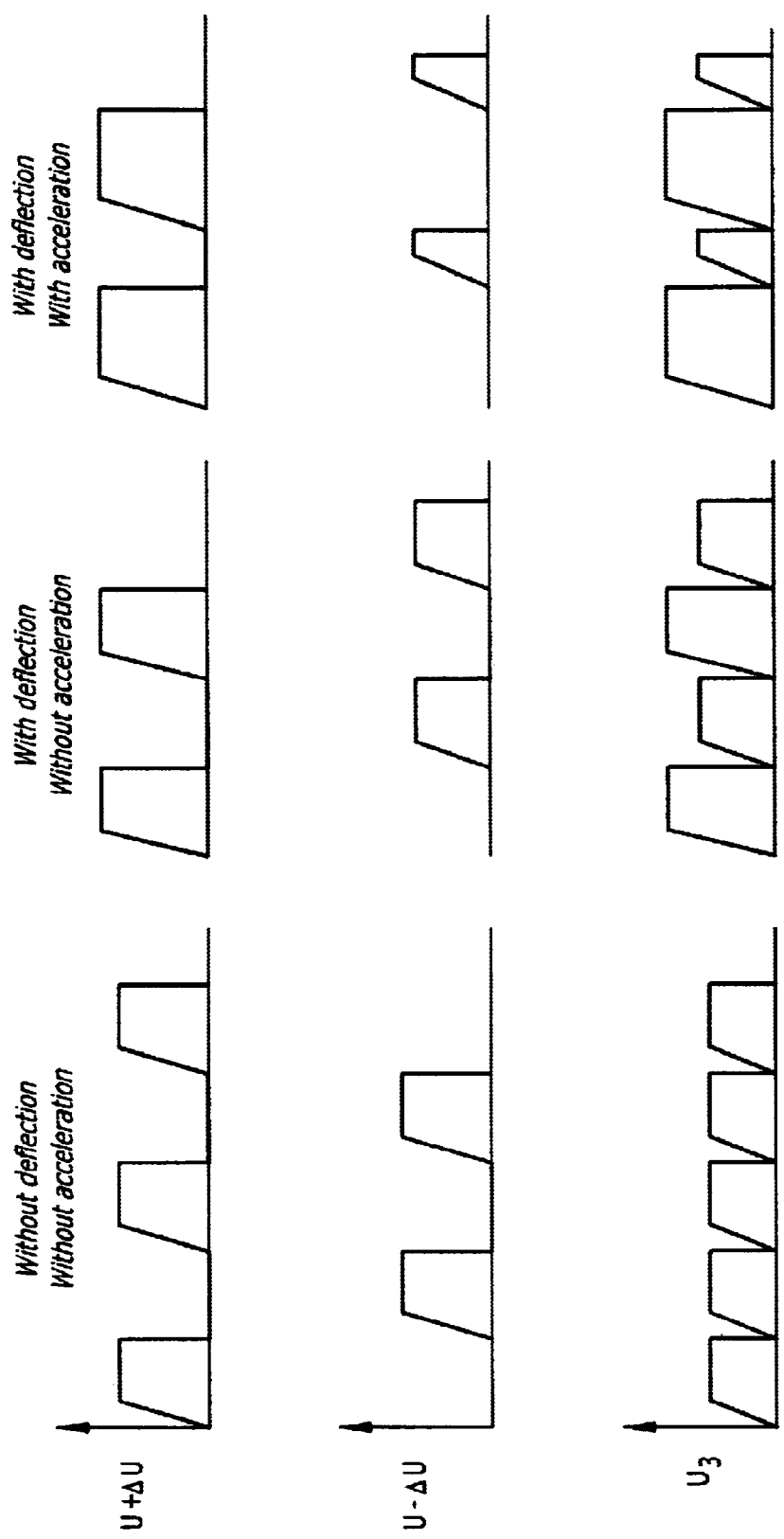
FIG. 5 is a series of timing diagrams, corresponding to FIG. 4, for charge control in accordance with the second known embodiment for simultaneous pulse-width variation, one pendulum P being deflected by acceleration.

The invention allows the wide dynamic range of the known accelerometer, described above with reference to FIGS. 2 and 4, to be retained while providing the advantage of a stable bias and additional, simple scale factor control. While this invention has been described with reference to its presently-preferred embodiment, it is not limited thereto. Rather, this invention is limited only in so far as it is defined by the following set of patent claims and includes within its scope all equivalents thereof.

What is claimed is:

1. In an accelerometer of the type having a micromechanical pendulum, capacitive pick off and a control loop reset by electrostatic forces and which, in a sequential time sequence, applies a resetting voltage between the pendulum and a first or a second electrode that are fixed relative to the pendulum and are aligned at respectively defined distances from opposite surfaces of said pendulum, the improvement comprising:
   a) voltage levels of pulses which act sequentially on said first and second electrodes being such that no charge difference flows when an identical force acts on both sides of said pendulum; and
   b) said voltage pulses responsive to an acceleration being proportional in duration to the voltage difference between said first and second electrodes so that the difference between pulse durations corresponds to said acceleration whereby said control loop detects a charge difference flowing via said pendulum as a control variable and influences electrostatic resetting forces on said pendulum.

2. An accelerometer as defined in claim 1 wherein the total charge flowing via said pendulum is detected in definable time slots to control scale factor.

* * * * *